(No Model.)
J. M. CASE.
PROCESS OF MANUFACTURING CORNMEAL.
No. 344,246. Patented June 22, 1886.
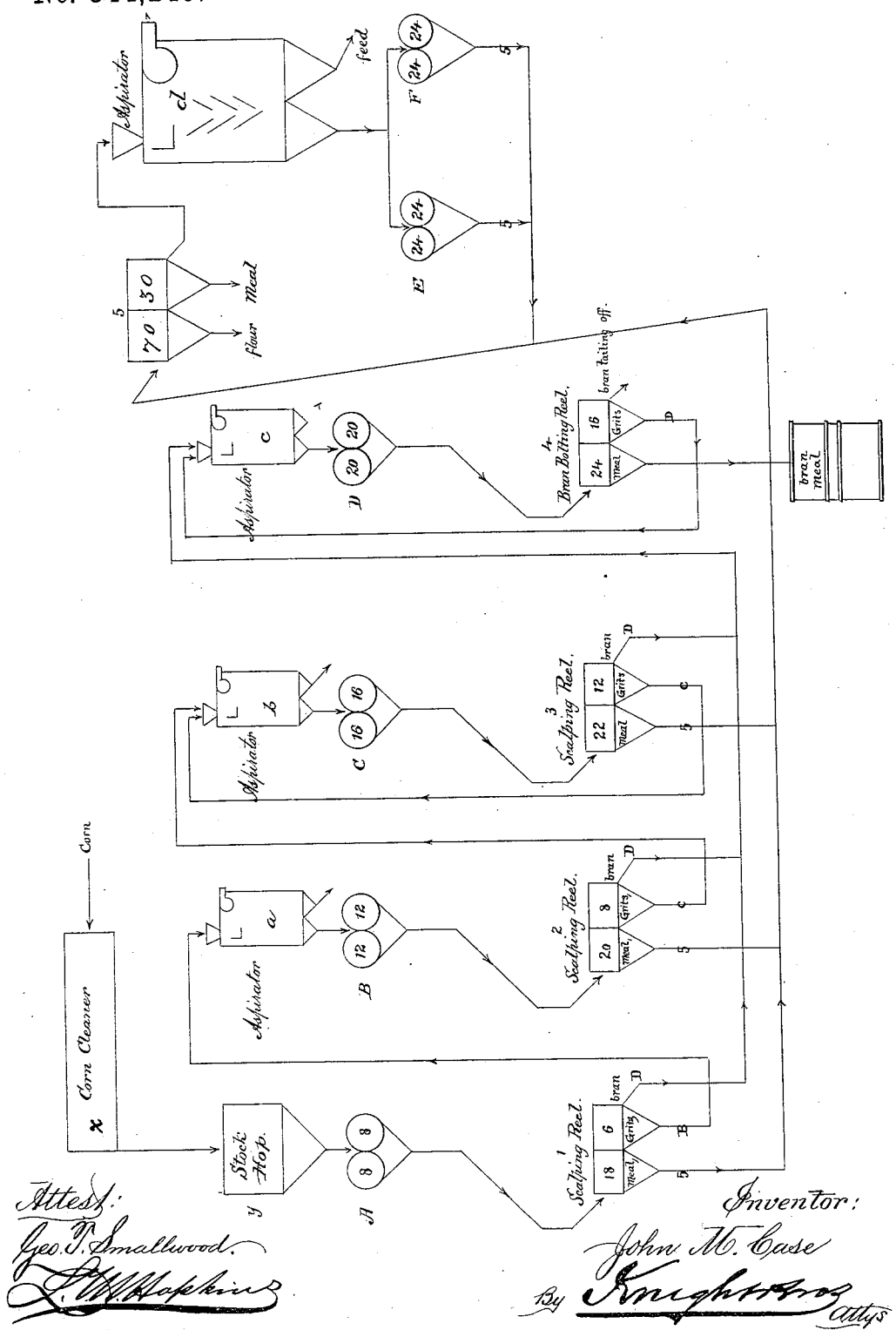

UNITED STATES PATENT OFFICE.

JOHN MURRAY CASE, OF COLUMBUS, OHIO, ASSIGNOR TO THE CASE MANUFACTURING COMPANY, OF SAME PLACE.

PROCESS OF MANUFACTURING CORNMEAL.

SPECIFICATION forming part of Letters Patent No. 344,246, dated June 22, 1886.

Application filed September 29, 1885. Serial No. 178,576. (No model.)

*To all whom it may concern:*

Be it known that I, JOHN MURRAY CASE, a citizen of the United States, residing at Columbus, in the county of Franklin and State of Ohio, have invented certain new and useful Improvements in the Process of Manufacturing Cornmeal, which is fully described in the following specification and more particularly pointed out in the claims.

The object of my invention is, while manufacturing cornmeal by the gradual-reduction system, to so manipulate the stock as to prevent the intermingling of the germ and bran products with the better qualities of grits and cornmeal. To do this I have adopted a system entirely different from that hitherto in use, and consisting, essentially, in removing the bran and impure products which pass off as tailings from the several scalping-reels, and sending them directly to the last rolls and reel, breaking and bolting them separately, by which means I obviate the necessity of passing the deleterious matter which has once become liberated from the more valuable material successively through the entire series of breaking-rolls, with the result of disintegrating it and mixing it with the glutinous and starchy parts of the corn in such a manner as to greatly impair the value of the meal.

In order that my invention may be fully understood, I will proceed to describe it in detail, referring to the accompanying drawings, in which is diagrammatically illustrated apparatus for carrying out my invention.

$x$ may represent a cleaner, to which the corn is first fed in the usual manner. It may be of any usual or preferred form, and is not an essential part of my invention.

$y$ is the stock-hopper, to which the corn is fed for supply to the breaking-rolls.

The sets of rolls are lettered A B C D E F, A B C being the breaking-rolls, D the bran-finishing rolls, and E F the meal-finishing rolls. The rolls used are of the ordinary kind. Any desired number of breaks may be used; but I prefer the above number, so as to have three successive breaks of the corn and grits and one of the bran and other tailings. The rolls are provided with corrugations increasing in number as the particles to be ground become finer. Thus I prefer to use eight cuts to the inch on the first set, twelve cuts on the second, sixteen on the third, and twenty cuts on the fourth, this last being the bran-finishing roll. The number of corrugations to the inch of each roll is indicated by figures thereon.

The reels are numbered from 1 to 5, the first three being the scalping-reels separating the product into bran, grits, and meal, the fourth the final bran-bolting reel, and the fifth the dusting and separating reel, to which the ground material from all the scalping-reels as well as from the final aspirator, $d$, and finishing-rolls E and F is sent. The wires of the reels are graduated in fineness substantially as indicated by the figures on the reels in the diagram. Each reel is divided, the parts being covered with wire cloth or gauze of different and advancing degrees of fineness. From the finer cloth or gauze of each reel falls the finer product in the form of meal or flour and from the coarser the grits which are to be subjected to retreatment. While the cloth at each end of the bolts advances in fineness from the first to the last the ratio of advance is not equal. Thus reel 1 may have a portion covered with No. 18 wire-cloth for separating out the finer particles and a portion covered with No. 6 wire-cloth for separating out the coarse heavy grits. Both the products in reel 2 being smaller than those in reel 1, the two ends of said reel are covered with wire-cloth of finer grades than those of reel 1, say with No. 20 and No. 8, respectively. So in reel 3, the two ends are covered with Nos. 22 and 12 wire-cloth, in reel 4 with Nos. 24 and 16 wire-cloth, and in the final dusting-reel, 5, with Nos. 70 and 30 wire-gauze, respectively.

Separate aspirators $a$, $b$, and $c$ are shown for drawing off the dust and lighter impurities from the grits after the product has passed through each scalping-reel; but this forms no necessary part of my process, and may be changed at will. For example, a single aspirator, $d$, may be employed for the whole system for removing the lighter impurities from the material as it tails off from the dusting and separating reel 5, and permitting the purified grits to pass on to the finishing-rolls E F.

I will now follow the flow of stock through the mill, all necessary machinery for aiding its movement or for propelling the machinery being supposed and being of ordinary construction. From the cleaner $x$ and hopper $y$ the grain falls between the first breaking-rolls A, and thence it passes to scalping-reel 1, whereby the bran-hulls and chits are almost entirely removed, and from the tail of reel 1 these are delivered to the bran-finishing rolls D, whereby the small amount of glutinous and starchy material adhering thereto is removed. The finer product from reel 1 falling through wire-cloth 18 is conveyed to reel 5, while the coarse grits falling through cloth 6 go to the second breaking-rolls, B. After the second break—that is, in the reground grits of the first break—there is also a certain amount of hulls which become disengaged from the particles of grits. These hulls, on the passing of the ground product from breaking-rolls B to scalping-reel 2 tail off from said reel, and are delivered, with the tailings of reel 1, to the bran-finishing rolls D, while the finer product from cloth 20 is led to reel 5, and the grits from cloth 8 to the third breaking-rolls, C. The material passing through break C and reel 3 is separated as before, the coarser grits from cloth 12 being returned, however, with the new grits from reel 2 to break C. From break D, to which the bran and particles of glutinous and starchy matter adhering thereto from the first three reels are supplied, the product passes to reel 4, where it undergoes, as before, three separations—the bran is tailed off for feed, the meal from cloth 24, which is of a very low grade, is drawn off, and the coarse grits from cloth 16 returned to rolls D for rebreaking. The bran and germs being once liberated from the more valuable products are thus subjected to but a single subsequent break, (the rolls D,) and that, as well as the separation of the products of such subsequent break, is performed separate from the more valuable products. The meal from this bran roll and reel is of a low grade, while from the remainder of the product, the treatment of which is presently to be described, a very high grade of pearl is produced. The finer grits or "meal" from all of the scalping-reels 1 2 3 (as well as from the aspirator $d$ and finishing-rolls E F) is fed together to the final dusting and separating reel 5, where also three separations are produced. It is found that a considerable percentage of the meal of the corn after passing through the successive breaks is not fine enough for meal, and therefore on its passing through reel 5 the portion passing over the tail of the reel is sent directly to the aspirator $d$, which draws out the bran fiber and impure particles, discharging the same as feed, the purified grits being passed to the finishing-rolls E F, and thence returned to the reel 5 for final treatment. From the gauze 70 of reel 5, on the other hand, the finest particles are drawn off in the form of corn-flour, it being undesirable to have this flour in with the meal, as by reason of heating and souring it would cause detriment thereto.

Between the gauze 70 and the tail of reel 5 all the better portions of the grain which are reduced to meal are drawn off through gauze 30. Of course, by varying the grade of gauze 30 at pleasure a miller may make a meal of a coarseness to suit his trade, the coarser the gauze the larger the meal and grits passed therethrough, while if only finely-divided meal be desired the gauze may be made of corresponding fineness. By this system of milling I am thus enabled to make a remarkably fine granular meal which is almost entirely free from any bran particles or fibrous matter, and also a lower grade of meal from the valuable particles which cling to the material tailing off from the several scalping-reels.

I have described the process by which both of these grades of meal are produced, but have claimed herein only the low-grade process, the other being claimed in my contemporaneous application, (Serial No. 195,982,) filed on the 20th day of March, 1886.

I am aware that it has been proposed to manufacture cornmeal by first breaking the corn, then separating the bran and germs from the grits, and then reducing the grits to the desired degree of fineness; but such is not the equivalent, nor do I claim it as my invention.

Having thus described my invention, the following is what I claim as new therein and desire to secure by Letters Patent:

1. The herein-described process of manufacturing cornmeal by the gradual-reduction system, which consists in subjecting the material to a series of successive breaks, separating the bran and germs from the grits after each break, and subjecting the bran and germs thus separated to subsequent reduction and separation separate from the grits, for the purpose set forth.

2. The herein-described process of manufacturing cornmeal by the gradual-reduction system, which consists in subjecting the material to a series of successive breaks, separating the bran and germs from the grits after each break, subjecting all the bran and germs thus separated to a single reduction-machine, and then separating the meal from the coarser material, as set forth.

3. The herein-described process of manufacturing meal by the gradual-reduction system, which consists in subjecting the material to a series of successive breaks, separating the bran and germs from the better products after each break, subjecting all the bran and germs thus separated to a single reduction-machine, separating it into three grades—i. e., meal, grits, and bran—drawing off the meal and bran separately, and returning the grits for further reduction, as set forth.

JOHN MURRAY CASE.

Witnesses:
 CHAS. F. HINDS,
 T. H. MCCOY.